Dec. 27, 1932.    C. A. HULSART    1,892,661
BOILER FURNACE
Filed May 13, 1927    3 Sheets-Sheet 2
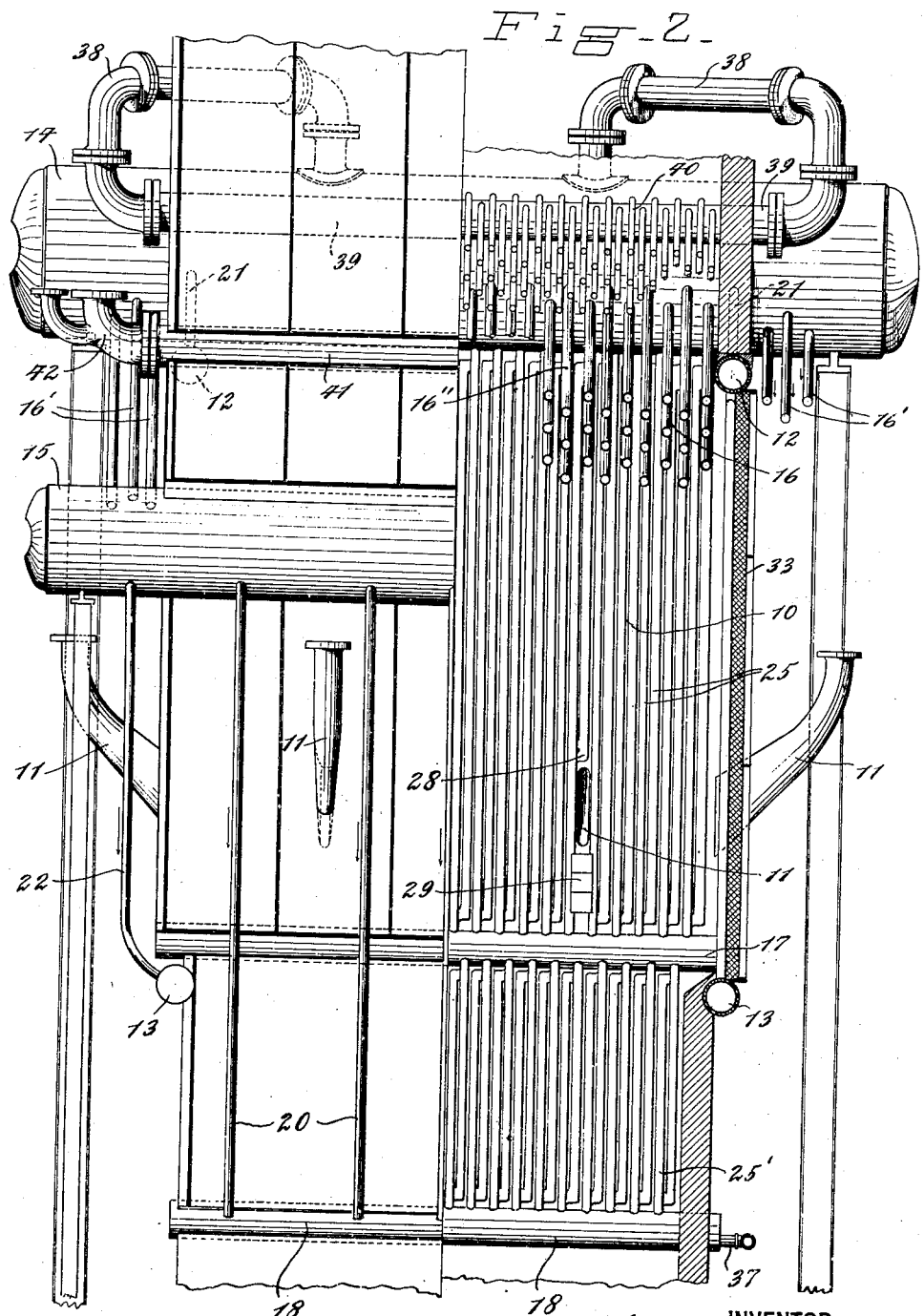
Fig-2-
INVENTOR
Charles A. Hulsart
BY
ATTORNEYS Dec. 27, 1932.   C. A. HULSART   1,892,661
BOILER FURNACE
Filed May 13, 1927   3 Sheets-Sheet 3
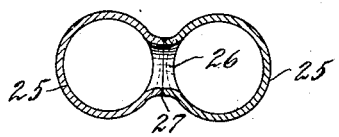
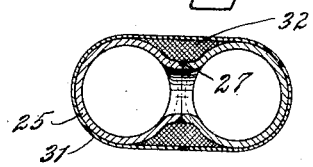
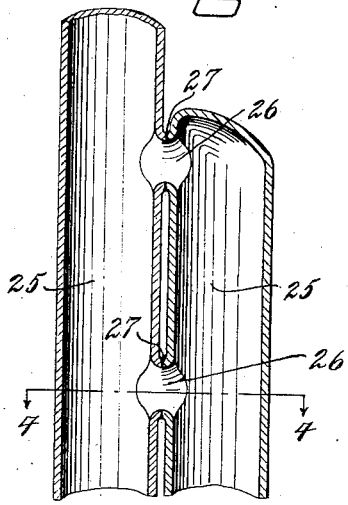
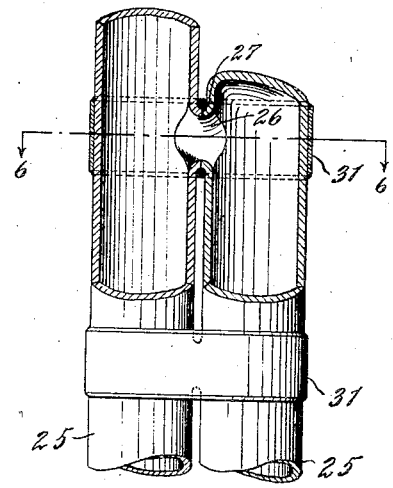
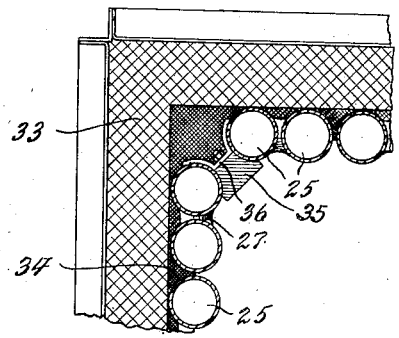
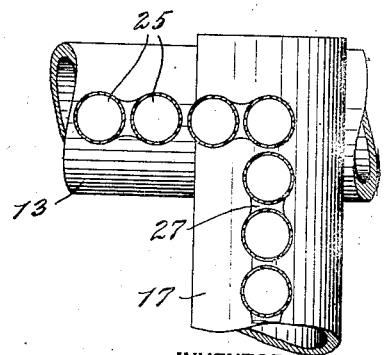
INVENTOR
Charles A. Hulsart
BY
Gifford and Scull
ATTORNEYS Patented Dec. 27, 1932

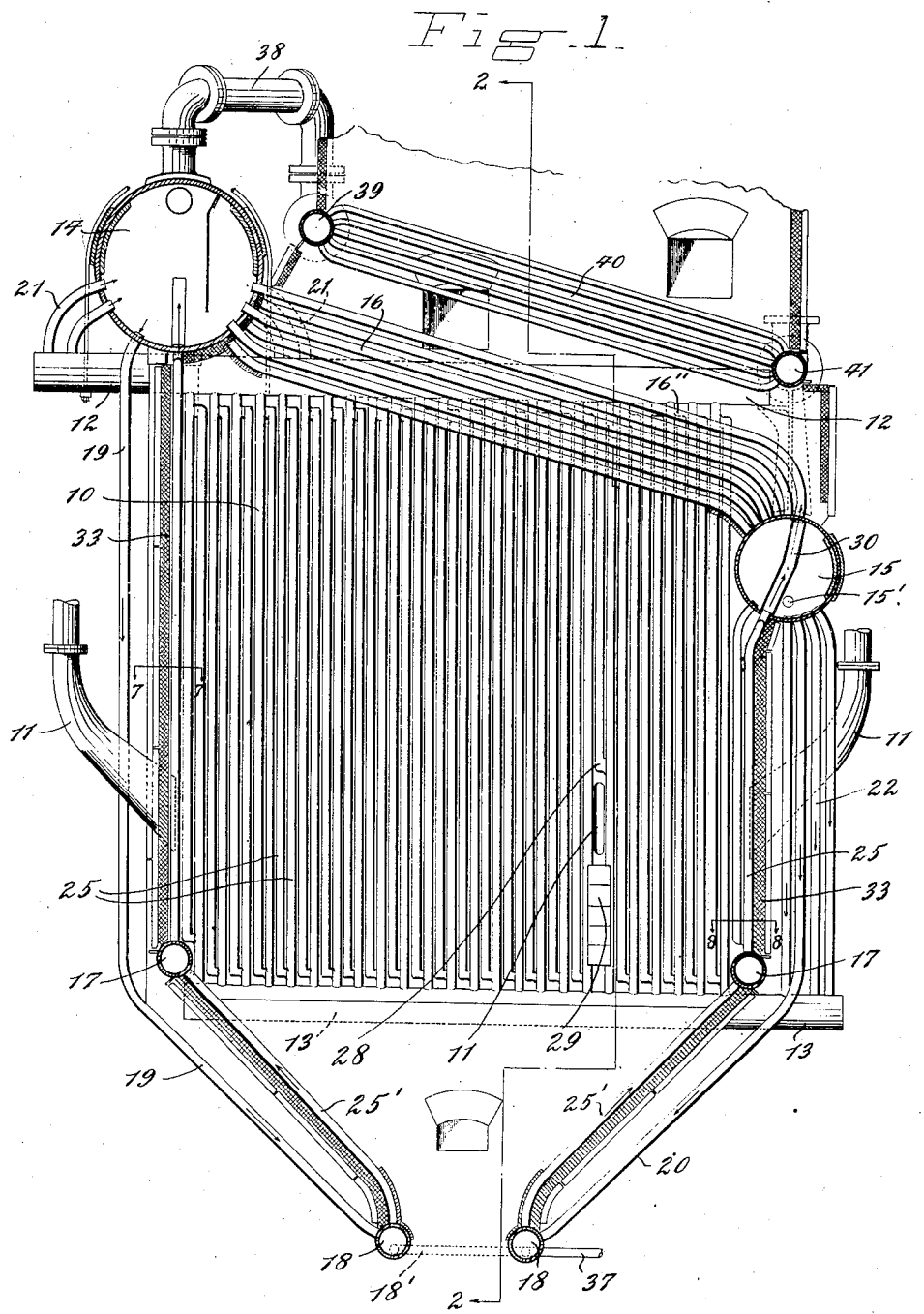

1,892,661

UNITED STATES PATENT OFFICE

CHARLES A. HULSART, OF WESTFIELD, NEW JERSEY, ASSIGNOR, BY MESNE ASSIGNMENTS, TO FULLER LEHIGH COMPANY, A CORPORATION OF DELAWARE

BOILER FURNACE

Application filed May 13, 1927. Serial No. 190,998.

This invention relates to a boiler furnace in which water tubes that are connected to the boiler circulation system are installed close together along the walls of the furnace. The invention will be understood from the description in connection with the accompanying drawings, in which Fig. 1 is a vertical section through an illustrative embodiment of the invention; Fig. 2 is a view partly in front elevation and partly in section along the line 2—2 of Fig. 1; Fig. 3 is a sectional view on an enlarged scale showing some of the details; Fig. 4 is a section along the line 4—4 of Fig. 3; Fig. 5 is a view similar to Fig. 3 showing a modification; Fig. 6 is a section along the line 6—6 of Fig. 5; Fig. 7 is a section along the line 7—7 of Fig. 1, and Fig. 8 is a section along the line 8—8 of Fig. 1.

In the drawings, reference character 10 indicates a furnace that is provided with fuel burners 11 for pulverized coal, for example. Headers 12 are provided on each side of the furnace at the upper portion thereof, and corresponding headers 13 are provided below the headers 12 at the lower portion of the furnace. Transverse drums 14 and 15 are provided at the upper portion of the furnace at right angles to the headers 12 with a bank of tubes 16 connecting the drums and extending across the upper portion of the furnace 10. Headers 17 are located on opposite sides of the furnace at the lower portion thereof below the drums 14 and 15, and headers 18 are located below and extend parallel to the headers 17, the headers 18 being nearer together than the headers 17. One or more tubes 19 extend from the water space of the drum 14 to one of the headers 18, and one or more tubes 20 extend from the lower portion of the drum 15 to the other header 18. Curved tubes 21 extend from the drum 14 to the headers 12 and tubes 22 extend from the drum 15 to the headers 13. All of the tubes 19, 20, 21 and 22 are outside of the furnace.

Tubes 25 located close to each other extend along the walls of the furnace on both sides and at the front and rear. These tubes 25 are installed in pairs, so that the upper end of only one of the tubes of the pair is connected to an upper header or drum, and the lower end of the other tube of the pair is connected to a lower header. The lower end of a tube whose upper end is connected to a drum or header, terminates above the lower end of the other tube of the pair, and the upper end of the other tube of the pair terminates below the upper end of the tube that is connected to a drum or header, and the end of each tube that is not connected to a drum or header is connected to the side of the tube of its pair. This is most clearly shown in Figs. 3 and 4, where one or more openings 26 are made in the tubes along the sides that are to be adjacent each other, and the metal surrounding the openings is pressed outwardly and welded together along the line 27, thus connecting the tubes.

In the modification shown in Figs. 5 and 6, the tubes 25 are connected as above described, and are reinforced by means of bands 31 that extend around the tubes in the vicinity of the openings 26, thus relieving the strain on the welded portions 27. In this modification, luting material 32 may be installed between the bands 31 and the welded portions 27.

Rows of tubes 25' connected in pairs, as above described, are also installed along the sloping walls of the ash pit below the furnace, so as to connect the headers 17 and 18.

In order to make provision for installation of fuel burners that project between tubes, one of the tubes of one pair of tubes for each burner may be made shorter than the others, as shown at 28 in Fig. 1, thus leaving a space through which the narrow mouth of the fuel burner 11 can project. Tile 29 may be installed below the burner 11 to close the space between the other tubes.

The tubes 25 along the front wall of the furnace that connect the header 17 with the drum 15 are provided at their upper ends with short tube sections 30 that extend through the drum to connect the tubes 25 to a row of tubes 16" that lead from the drum 15 to the drum 14.

A casing or layer of insulating material 33 (Figs. 1, 2 and 7) is installed on the outside of the tubes 25, and luting material 34 is placed between the tubes and the casing and extends into the small spaces between the tubes 25. A vertical row of tile 35 may be installed at the corners between the tubes, being held in place by metal saddles 36. Or, the tubes may be assembled in pairs and connect the headers as indicated in Fig. 8, thus dispensing with the necessity for the extra row of tile at the corners.

A blow off outlet pipe 37 may be connected to the headers 18, and feed water may be fed into the drum 15, as shown at 15', or any of the other headers, or into the drum 14 in any well known manner. Connections 38 extend from the steam space of the drum 14 to the header 39 of the superheater, the tubes 40 of which extend across the gas flue above and parallel to the tubes 16 into the superheater outlet header 41. The outlet header 41 may be connected in any convenient manner as, for example, by means of the connection 42 to the steam main.

The operation is as follows: The water level in the boiler is maintained at such point that the steam and water drum 14 is partially filled with water while the drum 15 and the headers 12, 13, 17 and 18 are all below the normal water level. The hot products of combustion resulting from the combustion of the fuel that is introduced through the burners 11 rises and passes across the tubes 16 and 40, while the ash and slag from the same drops downwardly into the ash pit, passing out through the opening between the headers 18. The water circulates upwardly through the tubes 25' and 25 along the walls of the ash pit and furnace. The mixture of steam and water passing upwardly along the side walls of the furnace enters the headers 12 and thence passes into the steam and water drum 14, as indicated by the arrows, while the mixture of steam and water passing upwardly through the tubes 25 at the rear of the furnace passes directly into the steam and water drum 14. The mixture of steam and water passing upwardly through the tubes 25 at the front of the furnace passes through the short tubes 30 in the drum 15, thence through the tubes 16'' into the steam and water drum 14. Water passes downwardly from the water space of the steam and water drum 14 through the tubes 19 into the headers 18 that are cross connected by the tube 18' and water also passes downwardly from the drum 14 through the tubes 16' outside of the furnace into the drum 15, thence downwardly through the tubes 22 located outside of the furnace into the headers 13, and also downwardly through the tubes 20 into one of the headers 18. Preferably the total area of the connections between tubes at one end of the pairs is less than the cross sectional area of a single tube, so that these connections form restricted passages, thus tending to cause equalization of distribution of the water through the tubes. The burners 11 are preferably located to one side of the middle of the respective walls of the furnace, thus causing a somewhat whirling or spiral movement of the products of combustion. The products of combustion in the illustrative embodiment pass only once across the tubes 16 and 40.

I claim:

1. In a boiler, a furnace, and water tubes along a wall of said furnace connected to adjacent tubes through openings in the sides of said tubes.

2. In a boiler, a furnace, and water tubes along a wall of said furnace connected to adjacent tubes through openings in the sides of said tubes in the plane of the wall.

3. In a boiler, a furnace, and water tubes along a wall of said furnace, said tubes being connected near the ends thereof to openings in the sides of adjacent tubes.

4. In a boiler, a primary combustion chamber, wall cooling tubes for said chamber, and fuel burners, some of said tubes being cut away and joined directly to adjacent tubes to accommodate said burners.

5. In a boiler, a primary combustion chamber, wall cooling tubes for said chamber and a fuel burner, one of said tubes being cut away and joined directly to an adjacent tube to accommodate said burner.

CHARLES A. HULSART.